United States Patent [19] [11] 4,194,422
Williams [45] Mar. 25, 1980

[54] TUBING NOTCHER

[76] Inventor: David A. Williams, 2484 Pinto Ln., Norco, Calif. 91760

[21] Appl. No.: 947,717

[22] Filed: Oct. 2, 1978

[51] Int. Cl.[2] .......................... B26D 3/10; B26D 3/14
[52] U.S. Cl. .......................... 83/581; 83/630; 83/693; 83/694; 83/917
[58] Field of Search .......................... 83/54, 581, 630, 633, 83/694, 917, 693

[56] References Cited

U.S. PATENT DOCUMENTS

| | | | |
|---|---|---|---|
| 277,452 | 5/1883 | Brandt | 83/633 X |
| 1,491,464 | 4/1924 | Coomer | 83/633 X |
| 2,126,519 | 8/1938 | Vogel | 83/54 X |
| 2,364,334 | 12/1944 | Wold | 83/630 X |
| 3,073,195 | 1/1963 | Koster | 83/581 X |

FOREIGN PATENT DOCUMENTS

| | | | |
|---|---|---|---|
| 11357 | 2/1962 | Japan | 83/581 |

*Primary Examiner*—J. M. Meister
*Attorney, Agent, or Firm*—Jack C. Munro

[57] ABSTRACT

A tubing notcher which comprises a housing having a longitudinally slidable cutter assembly attached thereto. The cutter assembly is to be manually moved through an appropriate actuation means connected to the cutter assembly. The cutter assembly includes a cutter which has an arcuate cutting edge. A tube, the open end of which is to be notched, is to be located upon a guide means which is fixedly secured to the housing. The guide means is inclined slightly less than a right angle in respect to the longitudinal axis of movement of the cutter. The cutter is to be located within the open end of the tube and upon movement of the cutter the open end of the tube is appropriately notched.

3 Claims, 6 Drawing Figures

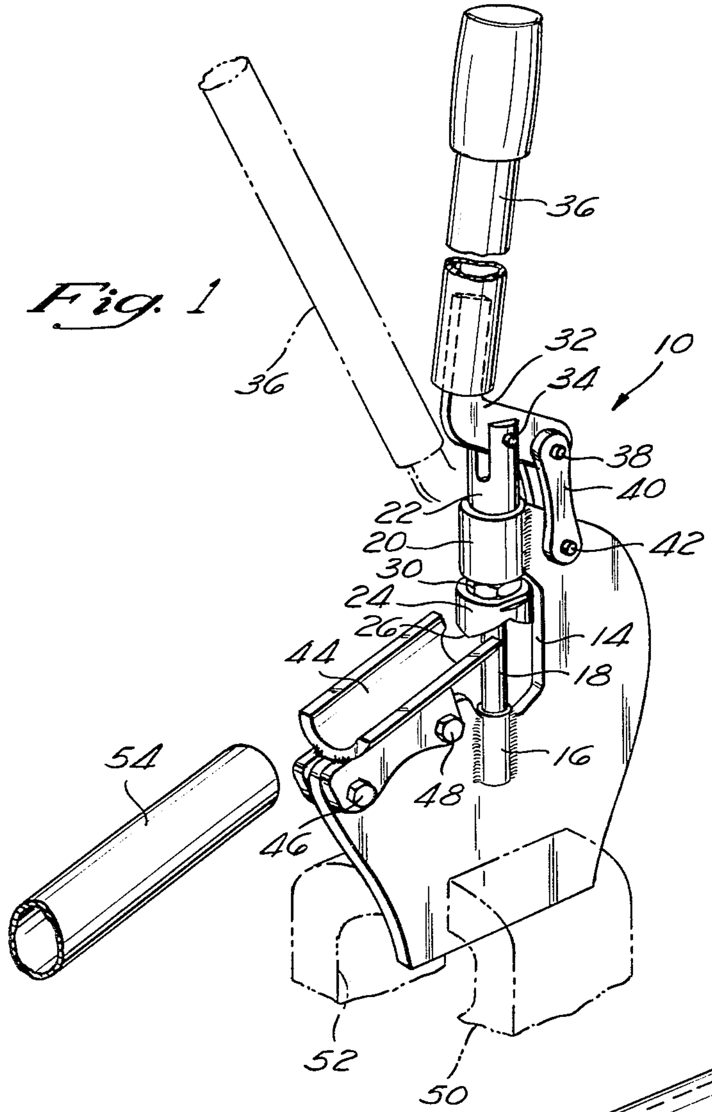
Fig. 1
Fig. 6
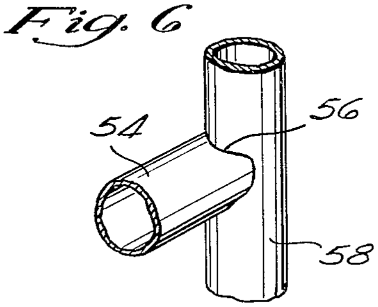
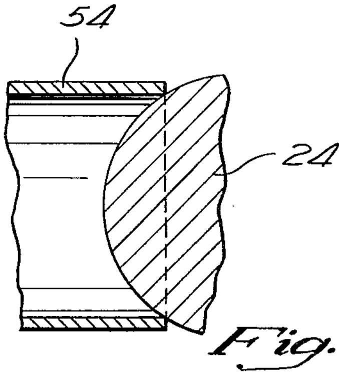
Fig. 3
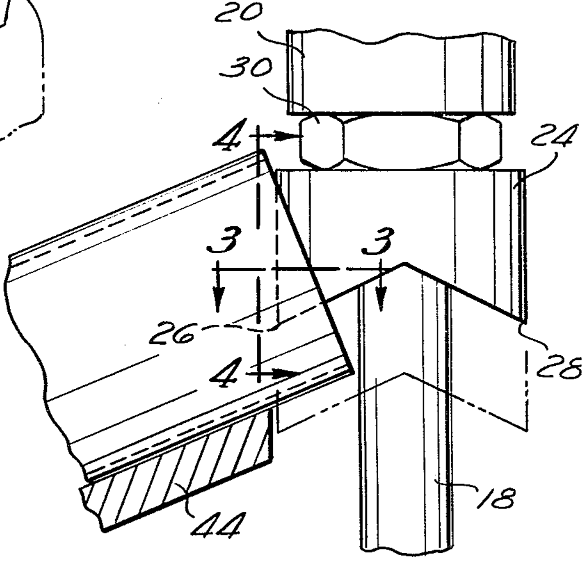
Fig. 2
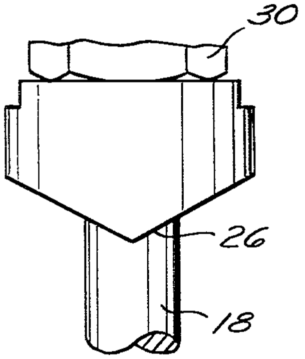
Fig. 4
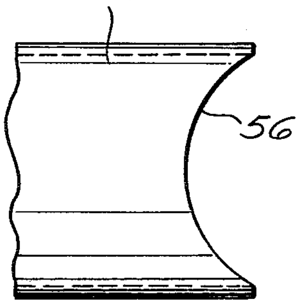
Fig. 5

TUBING NOTCHER

BACKGROUND OF THE INVENTION

A substantial number of structures are constructed of cylindrical tubes. The material of construction of such tubes is metallic with usually the metal being steel. Examples of structures which are to be built from such tubing would be roll bars for vehicles and supporting frameworks for certain types of structures.

In the working with such tubes it is necessary to securely connect together a plurality of such tubes. Frequently the interconnection requires that a given tube extends substantially perpendicular from another tube. The open end of the perpendicular tube is located in a given plane and does not matingly conform to the exterior surface of the tube to which it is to be connected.

In the past, it has been common to "notch" the open end of the tube to facilitate attachment to the tube to which it is to be connected. This notch is normally not shaped to closely conform to the tube surface as generally the notch is V-shaped and has planer side walls. The tubular surface to which the notched tube is to be connected is not V-shaped but has a round arcuate configuration.

Previous to this invention, there was no known device would could quickly and easily notch the end of a tube so as to closely conform to the exterior surface of another tube to which it is to be connected in a perpendicular manner. Once the tube is located in close conformity with the exterior surface of another tube, the two tubes are merely fixedly connected together by welding.

SUMMARY OF THE INVENTION

The structure of this invention is believed to be summarily described in the Abstract of the Disclosure and reference is to be had thereto.

The primary objective of this invention is to construct a device which will quickly and easily notch the open end of a tube so as to facilitate interconnection with a similar tube in a perpendicular relationship.

Another objective of the tubing notcher of this invention is to construct the tubing notcher so as to be constructed of few parts and which can be readily operated by even the most unskilled labor.

A further objective of this invention is that the cutting hole within the tubing notcher of this invention is constructed to be extremely hard so that the cutting blade has an extremely long life.

BRIEF DESCRIPTION OF THE DRAWING

FIG. 1 is an isometric view of the tubing notcher of this invention depicting how the notcher of this invention would be employed to notch the end of a tube;

FIG. 2 is a side view of the cutting blade assembly incorporated within the tubing notcher of this invention depicting the cutting procedure;

FIG. 3 is a cross-sectional view taken along line 3—3 of FIG. 2; and

FIG. 4 is a cross-sectional view of the forward edge of the cutter incorporated within the cutting blade assembly of the tubing notcher of this invention; and FIG. 5 is a top view of the open end of a tube which has been notched by the tubing notcher of this invention; and FIG. 6 is an isometric view showing a pair of tubes being interconnected together in a perpendicular relationship with one of the tubes having been notched by the tubing notcher of this invention.

DETAILED DESCRIPTION OF THE SHOWN EMBODIMENT

Referring particularly to the drawing there is shown the tubing notcher 10 of this invention whose main supportive member is a housing 12. The housing 12 takes the form of a thin, planar metallic plate. The housing 12 includes a cut-out section 14.

Integrally formed with the housing 12 at the lower end of the cut-out section 14 is a first sleeve 16. The sleeve 16 has an internal cylindrical opening therein within which is slidably supported a rod 18. Integrally formed with the housing 12 at the upper end of the cut-out section 14 is a second sleeve 20. The longitudinal center axes of the sleeves 20 and 16 coincide.

The rod 18 is fixedly secured to the rod 22 and at the area of joinder therebetween there is located a cutter 24. The cutter 24 is circular in cross-section and includes on its lower edge thereof a pair of cutting edges 26 and 28. The cutting edges 26 and 28 are identical with respect to each other and in actual practice only one of the cutting edges will be employed at a given time.

The interconnection between the rods 18 and 22 is by means of a threaded connection and a nut 30. The nut 30 when tightened against the upper surface of the cutter 24 fixedly secures the cutter 24 to the rod 18. Upon loosening of the nut 30, the cutter 24 can be rotated about the rod 18 so that the cutting edge 28 could be employed instead of the cutting edge 26. Although the cutting edges 26 and 28 are constructed so as to stay sharp for an extremely long period of time, the fact that the cutter 24 does include two separate cutting edges significantly extends the useful life of the tubing notcher 10 of this invention. The cutter 24 may be removed and the cutting edges sharpened if necessary.

The upper end of the rod 22 is bifurcated and pivotly connects by means of a pin 34 to a line 32. The outer end of the link 32 is to be connectable with an elongated handle or lever 36. The lever 36 is to be employed manually to facilitate operation of the cutter 10 of this invention.

The link 32 is also pivotly connected by means of a pin 38 to a second link 40. The free end of the link 40 is pivotly connected by a pin 42 to the housing 12.

Also mounted on the housing 12 is a guide means in the form of a trough 44. The trough 44 is fixedly positioned upon the housing 12 by means of fasteners 46 and 48.

The tubing notcher 10 of this invention, while it is being used, is to be fixedly secured as between the jaws 50 and 52 of a vise. The cutter 24 is then located in the uppermost position which is the non-cutting position. It is presumed that the handle or lever 36 has been placed to cooperate with the link 32 as shown in FIG. 1 of the drawing.

The operator then places a tube 54 upon the trough 44. The operator manually moves the open end of the tube 54 so that a portion of the cutter 24 (actually cutting edge 26) is located within the open end of the tube 54. This position is shown within FIG. 2 of the drawing. The tube 54 is manually moved as far as possible so that the cutting edge 26 is located as deep as possible within the open end of the tube. In this position the operator merely pushes against the handle 36 which in turn causes the cutting blade 24 to be lowered which then cuts a portion of the tube 54 around the open end of the tube 54.

The cutter is then moved back to the non-cutting position and the tube 54 is removed and turned over and replaced in the position to be cut. The cutting procedure is then repeated.

The result is fishmouthed section 56 formed within the open end of the tube 54. This fishmouthed section 56 is to snugly cooperate against the sidewall of another tube 58. With the tubes 54 and 58 connected together in a close fitting relationship, the tubes can be readily welded together and an extremely strong weld will result. The notcher of this invention is of particular advantage since it is self contained, that is, there is no need for an expensive press to operate the notcher. Additionally, this notcher will notch different sizes of tubing without changing the cutting block. Further, this notcher can notch tubing to fit an angle by making a small notch on one side of the tube and then making a larger notch on the opposite side of the tube. The so notched tube then connects with another tube at other than a right angle. The angle of connection of the tubes can be controlled by controlling the notch sizes.

What is claimed is:

1. A tubing notcher comprising:

a housing;

a cutter assembly movably mounted on said housing along a longitudinal axis, said cutter assembly including a cutter, said cutter having a cutting edge, said cutting edge being arcuate;

actuation means connected to said cutter, said actuation means for moving said cutter between a cutting position and a non-cutting position;

guide means mounted on said housing adjacent said cutter, said guide means having a longitudinal center axis, said longitudinal center axis being inclined in respect to said longitudinal axis with the inclination being slightly less than a right angle, whereby the tube is to be located upon said guide means with said cutter being positioned within the open end of said tube and upon said cutter being moved by said actuation means the open end of said tube is arcuately cut, said cutting edge comprising a segment of a circle with the circle being concentrically disposed about said longitudinal axis, said cutter being fixedly secured to a rod intermediate the ends thereof, each end of said rod being slidingly mounted within a sleeve, with there being two separate spaced apart sleeves, each of said sleeves being fixedly secured to said housing, the portion of said rod directly adjacent said cutting edge being substantially smaller in cross-section than the area of said circle of said cutting edge to permit insertion of said cutting edge into said open end of said tube, whereby a single size of cutter may be employed to cut various different diameter tubes.

2. The tubing notcher as defined in claim 1 wherein:

said actuation means includes a linkage assembly, one end of said linkage assembly being pivotly secured to said housing, the opposite end of said linkage assembly being adapted to connect with an elongated lever, said cutter assembly being pivotly secured to said linkage assembly intermediate the ends thereof.

3. The tubing notcher as defined in claim 2 wherein:

said guide means comprises a trough.

* * * * *